US008082340B2

(12) United States Patent
 Filsfils et al.

(10) Patent No.: US 8,082,340 B2
(45) Date of Patent: Dec. 20, 2011

(54) TECHNIQUE FOR DISTINGUISHING BETWEEN LINK AND NODE FAILURE USING BIDIRECTIONAL FORWARDING DETECTION (BFD)

(75) Inventors: Clarence Filsfils, Brussels (BE); David D. Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1100 days.

(21) Appl. No.: 11/343,051

(22) Filed: Jan. 30, 2006

(65) Prior Publication Data

US 2007/0180105 A1    Aug. 2, 2007

(51) Int. Cl.
*G06F 15/173* (2006.01)
(52) U.S. Cl. .................................. 709/224; 709/206
(58) Field of Classification Search .................. 709/206, 709/224; 714/4
See application file for complete search history.

(56) References Cited

U.S. PATENT DOCUMENTS

| 6,324,161 | B1 * | 11/2001 | Kirch ............................ 370/217 |
| 6,442,713 | B1 * | 8/2002 | Block et al. ..................... 714/43 |
| 6,804,712 | B1 | 10/2004 | Kracht |
| 6,856,600 | B1 | 2/2005 | Russell et al. |
| 6,950,865 | B1 | 9/2005 | DePaolantonio |
| 6,965,936 | B1 * | 11/2005 | Wipfel et al. ................. 709/224 |
| 7,885,179 | B1 * | 2/2011 | Bryant et al. ................. 370/216 |
| 2001/0056553 | A1 * | 12/2001 | Suzuki et al. ..................... 714/4 |
| 2003/0151513 | A1 * | 8/2003 | Herrmann et al. ......... 340/573.1 |
| 2003/0233595 | A1 * | 12/2003 | Charny et al. ..................... 714/4 |

(Continued)

FOREIGN PATENT DOCUMENTS

JP    2005252385    *  9/2005

(Continued)

OTHER PUBLICATIONS

Francois et al. Achieving Sub-Second IGP The prior art made of record and not relied upon is considered pertinent to applicant's disclosure. Francois et al. Achieving Sub-Second IGP Convergence in Large IP Networks, ACM SIGCOMM Computer Communication Review, vol. 35, Is. 3, ACM New York, NY., Jul. 2005.*

(Continued)

*Primary Examiner* — Wing Chan
*Assistant Examiner* — Kostas Katsikis
(74) *Attorney, Agent, or Firm* — Cesari and McKenna, LLP

(57)    ABSTRACT

A technique distinguishes between link and node failure using bidirectional forwarding detection (BFD) in a computer network. According to the novel technique, a BFD session is established over a first link between a monitoring node and a first interface of a monitored node. In addition, one or more novel unidirectional BFD (uBFD) sessions from one or more corresponding other interfaces of the monitored node to the monitoring node (e.g., as configured by the monitored node to detect its failure), the one or more uBFD sessions traversing links other than the first link (e.g., "not-via" the monitored node) are established, the one or more uBFD sessions traversing links other than the first link (e.g., "not-via" the monitored node). For instance, the one or more uBFD sessions correspond to one or more line cards of the monitored node. In response to detecting a lack of connectivity resulting from, e.g., failure of the BFD session, the monitoring node determines that the first link has failed if at least one uBFD session is operational. Moreover, in response to detecting failure of the BFD session and all of the one or more uBFD sessions, the monitoring node determines that the monitored node has failed.

28 Claims, 5 Drawing Sheets

U.S. PATENT DOCUMENTS

| | | | |
|---|---|---|---|
| 2004/0028064 A1* | 2/2004 | Cetin et al. | 370/409 |
| 2004/0090913 A1* | 5/2004 | Scudder et al. | 370/219 |
| 2004/0179486 A1* | 9/2004 | Agarwal et al. | 370/316 |
| 2005/0044268 A1* | 2/2005 | Johnston-Watt et al. | 709/238 |
| 2005/0097219 A1 | 5/2005 | Goguen et al. | |
| 2006/0059478 A1* | 3/2006 | Krajewski et al. | 717/168 |
| 2007/0047556 A1* | 3/2007 | Raahemi et al. | 370/395.53 |

FOREIGN PATENT DOCUMENTS

| | | | |
|---|---|---|---|
| JP | 2005252385 A * | 9/2005 | |
| WO | WO 03/005648 A2 * | 1/2003 | |
| WO | WO 03005648 A2 * | 1/2003 | |

OTHER PUBLICATIONS

Huang et al. A Cooperative Intrusion Detection System for Ad Hoc Networks, Workshop on Security of ad hoc and Sensor Networks, Proceedings of the 1st ACM workshop on Security of ad hoc and sensor networks, Fairfax, Virginia ACM New York, NY., 2003.*

Steinder et al., Probabilistic Fault Localization in Communication Systems Using Belief Networks., IEEE/ACM Transactions on Networking (TON) vol. 12, Issue 5 (Oct. 2004).*

Tanenbaum, Andrew S., Section 1.4.2 The TCP/IP Reference Model, Computer Networks: Fourth Edition, pp. 41-44, Pearson Education, Inc., 2003.

Perlman, Radia, Interconnections Second Edition: Bridges, Routers, Switches, and Internetworking Protocols, Sections 12.1-12.3 pp. 299-324, Addison Wesley longman, Inc. 2000.

Y. Rekhter and T. Li, RFC 1771, entitled A Border Gateway Protocol 4 (BGP-4), pp. 1-48, Mar. 1995.

Ivan Pepelnjak and Jim Guichard, MPLS and VPN Architectures, Chapters 8-9 pp. 145-205, Cisco Press 2001.

Rosen, E. et al., RFC 2547, entitled BGP/MPLS VPNs, pp. 1-24, Mar. 1999.

Katz, D. et al., Network Working Group Internet Draft, entitled Bidirectional Forwarding Detection (draft-ietf-bfd-base-04.txt), pp. 1-42, Oct. 2005.

Bryant, S., et al., Network Working Group Internet Draft, entitled IP Fast Reroute Using Not-via Addresses (draft-bryant-shand-IPFRR-notvia-addresses-01.txt), pp. 1-21, Oct. 2005.

U.S. Appl. No. 11/064,275, for Method and Apparatus for Constructing a Repair Path Around a Non-Available Component in a Data Communications Network, filed Feb. 22, 2005, by Bryant et al.

* cited by examiner

TECHNIQUE FOR DISTINGUISHING BETWEEN LINK AND NODE FAILURE USING BIDIRECTIONAL FORWARDING DETECTION (BFD)

BACKGROUND OF THE INVENTION

1. Field of the Invention

The present invention relates to computer networks and more particularly to distinguishing between link and node failure using bidirectional forwarding detection (BFD) in a computer network.

2. Background Information

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein. A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header.

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system." In general, a routing domain may operate as an enterprise network, a service provider or any other type of network or subnetwork. Further, the routing domain may contain one or more edge devices having "peer" connections to edge devices in adjacent routing domains.

Network nodes within a routing domain are typically configured to forward data using predetermined paths from "interior gateway" routing protocols, such as conventional link-state protocols and distance-vector protocols. These interior gateway protocols (IGPs) define the manner with which routing information and network-topology information are exchanged and processed in the routing domain. The routing information exchanged (e.g., by IGP messages) typically includes destination address prefixes, i.e., the portions of destination addresses used by the routing protocol to render routing ("next hop") decisions. Examples of such destination addresses include IP version 4 (IPv4) and version 6 (IPv6) addresses. As such, each intermediate node receives a consistent "view" of the domain's topology. Examples of link-state and distance-vectors protocols known in the art, such as the Open Shortest Path First (OSPF) protocol and Routing Information Protocol (RIP), are described in Sections 12.1-12.3 of the reference book entitled *Interconnections, Second Edition*, by Radia Perlman, published January 2000, which is hereby incorporated by reference as though fully set forth herein.

The Border Gateway Protocol (BGP) is usually employed as an "external gateway" routing protocol for routing data between autonomous systems. BGP is well known and generally described in Request for Comments (RFC) 1771, entitled *A Border Gateway Protocol 4 (BGP-4)*, by Y. Rekhter et al., published March 1995, which is publicly available through the Internet Engineering Task Force (IETF) and is hereby incorporated by reference in its entirety. External (or exterior) BGP (eBGP) is often used to exchange routing information across routing domain boundaries. Internal BGP (iBGP) is a variation of the eBGP protocol and is often used to distribute inter-network reachability information (address prefixes) among BGP-enabled edge devices situated within the same routing domain. BGP generally operates over a reliable transport protocol, such as TCP, to establish a TCP connection/BGP session. BGP also may be extended for compatibility with services other than standard Internet connectivity. For instance, Multi-Protocol BGP (MP-BGP) supports various address family identifier (AFI) fields that permit BGP messages to transport multi-protocol information, such as is the case with RFC 2547 services, discussed below.

A network node within a routing domain may detect a change in the domain's topology. For example, the node may become unable to communicate with one of its neighboring nodes, e.g., due to a link failure between the nodes or the neighboring node failing, such as going "off line," etc. If the detected node or link failure occurred within the routing domain, the detecting node may advertise the intra-domain topology change to other nodes in the domain using IGP messages. Similarly, if an edge device detects a node or link failure that prevents communications with a neighboring routing domain, the edge device may disseminate the inter-domain topology change to other edge devices within its routing domain (e.g., using the iBGP protocol). In either case, propagation of the network-topology change occurs within the routing domain and nodes in the domain thus converge on a consistent view of the new network topology, i.e., without the failed node or link.

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN. When the pair of nodes is located in different routing domains, edge devices in a plurality of interconnected routing domains may have to cooperate to establish the nodes' virtual circuit.

A virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

Layer-3 network-based VPN services that utilize MPLS technology are often deployed by network service providers for one or more customer sites. These networks are typically said to provide "MPLS/VPN" services. As used herein, a customer site is broadly defined as a routing domain containing at least one customer edge (CE) device coupled to a provider edge (PE) device in the service provider's network ("provider network"). The customer site (e.g., a Voice over IP, or VoIP gateway) may be multi-homed to the provider network, i.e., wherein one or more of the customer's CE devices is coupled to a plurality of PE devices, thus providing a redundant connection. The PE and CE devices are generally intermediate network nodes, such as routers or switches, located at the edge of their respective networks. PE-CE data links may be established over various physical mediums, such as conventional wire links, optical links, wireless links, etc., and may communicate data formatted using various network communication protocols including ATM, Frame Relay, Ethernet, Fibre Distributed Data Interface (FDDI), etc. In addition, the PE and CE devices may be configured to exchange routing information over their respective PE-CE links in accordance with various interior and exterior gateway protocols, such as BGP, OSPF, IS-IS, RIP, etc. The MPLS/VPN architecture is generally described in more detail in Chapters 8-9 of the reference book entitled *MPLS and VPN Architecture, Volume* 1, by I. Pepelnjak et al., published 2001 and in the IETF publication RFC 2547, entitled *BGP/MPLS VPNs*, by E. Rosen et al., published March 1999, each of which is hereby incorporated by reference as though fully set forth herein.

As those skilled in the art will understand, it is desirable to quickly detect the failure of a PE-CE link (or other links) so that minimal traffic is lost. Conventionally, since a BGP session is often employed between the two inter-domain devices (e.g., a PE device and a CE device), BGP KEEPALIVE messages may be used to determine whether the peers are reachable (e.g., for link or node failure). For instance, BGP may specify a Hold Time interval, the expiration of which indicating that an error has occurred within the BGP session (e.g., at least three seconds). Each BGP message received at a device resets the Hold Time. A BGP KEEPALIVE message may be exchanged between the devices of the BGP session to reset the Hold Time. As such, the interval between exchanged KEEPALIVE messages must be often enough as not to cause the Hold Timer to expire. Conventionally, a reasonable maximum time between KEEPALIVE messages would be one third of the Hold Time interval. However, according to the BGP standard set forth in RFC 1771, the KEEPALIVE messages must not be sent more frequently than one per second, e.g., in order to minimize traffic between the BGP devices. Notably, in the event the Hold Time has expired, the devices may "break" (i.e., tear down or close) the BGP session.

Because of the increasing need for faster network response time and convergence, administrators often require the ability of individual network devices to quickly detect failures. Bidirectional Forwarding Detection (BFD) provides rapid failure detection times between devices, while maintaining low overhead. For instance, BFD failure detection may be as fast as 50 milliseconds (ms), while the BGP method described above is on the order of seconds (e.g., three seconds). BFD verifies connectivity between two devices based on the rapid transmission of BFD control packets between the two devices (e.g., little to no BFD holdtime, as will be understood by those skilled in the art). Notably, BFD also provides a single, standardized method of link/device/protocol failure detection at any protocol layer and over any media. A secondary benefit of BFD, in addition to fast failure detection, is that it provides network administrators with a consistent method of detecting failures. Thus, one availability methodology could be used, regardless of the protocol (e.g., IGP, BGP, etc.) or the topology of the network. BFD is further described in Katz, et al. *Bidirectional Forwarding Detection <draft-ietf-bfd-base-04.txt>*, Internet Draft, October, 2005, the contents of which are hereby incorporated by reference as though fully set forth herein.

One problem with using BFD is that it is difficult to determine whether a monitored node has failed, or if simply the link over which the BFD messages traverse has failed. All a monitoring node can definitely determine is that it has stopped receiving returned BFD messages from the monitored node. While this is still very useful for many applications, it is often important not to declare a node as failed ("down") when in fact the node is operational ("up"). For instance, two nodes (e.g., a CE device and a PE device) may be connected via multiple links for redundancy, as will be understood by those skilled in the art. If a BFD session is established over one of those links and that link fails, it is important to determine that only the BFD link is down if the other redundant links are still functioning. Declaring a node down when it is not produces undesirable results in the network, such as improper traffic forwarding, etc., as will be understood by those skilled in the art.

One solution to this problem involves the use of a "not-via" address. Not-via addresses are described in detail in Bryant, et al., *IP Fast Reroute Using Not-via Addresses <draft-bryant-shand-IPFRR-notvia-addresses--01.txt>*, Internet Draft, October 2005, and in commonly-owned U.S. patent application Ser. No. 11/064,275, entitled METHOD AND APPARATUS FOR CONSTRUCTING A REPAIR PATH AROUND A NON-AVAILABLE COMPONENT IN A DATA COMMUNICATIONS NETWORK, filed by Bryant et al. on Feb. 22, 2005, now published as U.S. Publication No. US2006/0187819 on Aug. 24, 2006, the contents of both which are hereby incorporated by reference in their entirety. The semantics of a not-via address are that a packet addressed to a not-via address must be delivered to the router/node advertising that address, not via the particular component, e.g., a link, node, shared risk link group (SRLG), etc., with which that address is associated.

The solution available using a not-via address generally consists of a "dual BFD" arrangement. For instance, a first BFD session is established along a first link between two nodes, and a second BFD session is established along a second link, not-via (excluding) the first link, between the two nodes. If the first BFD session fails, but the second remains operational, then it is determined that the first link has failed. If both BFD sessions fail, it is determined that the opposing node has failed.

A similar solution has been proposed using MPLS tunnels, as described in commonly-owned copending U.S. patent application Ser. No. 10/171,395, entitled DISTINGUISHING BETWEEN LINK AND NODE FAILURE TO FACILITATE FAST REROUTE, filed by Charny et al. on Jun. 12, 2002, currently published as U.S. Patent Application Publication No. 2003/0233595 on Dec. 18, 2003, the contents of which are hereby incorporated by reference in its entirety. In particular, a first MPLS tunnel may be created between two nodes over a first path, and a second (alternate) MPLS tunnel may be created between the two nodes over a second path that excludes the first path. If the first tunnel fails, the second tunnel is used to determine whether the first path has failed, or whether the opposing node has failed.

A problem with both proposed solutions above is that, while providing better determination of link versus node failure, they may both lead to false indications when only a portion of a node fails. Specifically, many not-via addresses and alternate tunnels utilize the same resources of a node, such as, e.g., a particular line card. For instance, for redundancy, many high-volume nodes share multiple links between each other. These multiple links, however, are often located within an SRLG, such as shared fibers, conduits, cables, etc., which often originate/terminate at a single line card of the node. The result is that many not-via address and/or alternate tunnels, while not utilizing the same link or interface, may utilize the same line card or other resources of the node. For this reason, if the shared resource fails at the node, the above solutions may produce a false indication of node failure. There remains a need, therefore, for a technique that rapidly and deterministically concludes that a node has in fact failed, as opposed to merely a link or shared resource (e.g., a line card) of the node.

SUMMARY OF THE INVENTION

The present invention is directed to a technique for distinguishing between link and node failure using bidirectional forwarding detection (BFD) in a computer network. According to the novel technique, a BFD session is established over a first link between a monitoring node and a first interface of a monitored node. In addition, one or more novel unidirectional BFD (uBFD) sessions from one or more corresponding other interfaces of the monitored node to the monitoring node (e.g., as configured by the monitored node to detect its failure) are established, the one or more uBFD sessions traversing links other than the first link (e.g., "not-via" the monitored node). For instance, the one or more uBFD sessions correspond to one or more line cards of the monitored node. In response to detecting a lack of connectivity resulting from, e.g., failure of the BFD session, the monitoring node determines that the first link has failed if at least one uBFD session is operational. Moreover, in response to detecting failure of the BFD session and all of the one or more uBFD sessions, the monitoring node determines that the monitored node has failed.

Advantageously, the novel technique distinguishes between link and node failure using BFD in a computer network. By establishing BFD and additional uBFD sessions from the monitored node along paths diverse from the first link, the novel technique provides the ability to determine whether a link (e.g., or line card) or node has failed depending upon which of the BFD and uBFD sessions remain operational. Accordingly, the present invention minimizes false detection of failed nodes, and thus minimizes performance of unnecessary node protection techniques.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
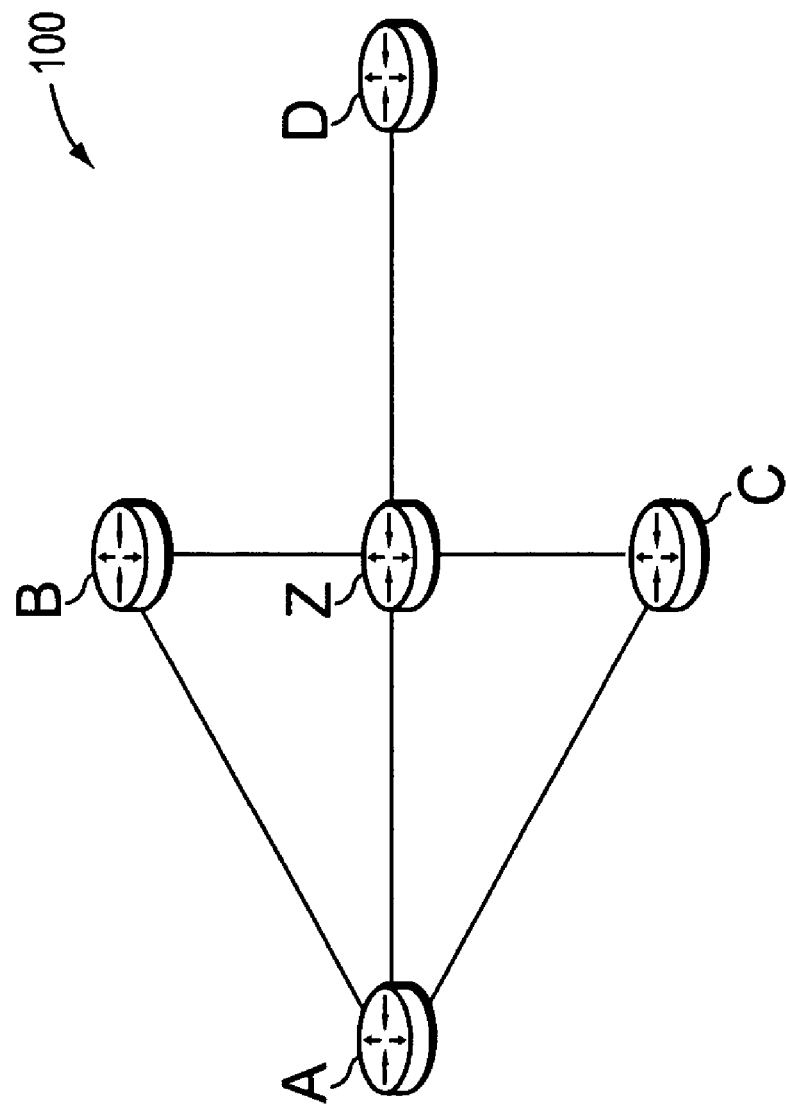
FIG. 1 is a schematic block diagram of an exemplary computer network that may be advantageously used with the present invention.

FIG. 1 is a schematic block diagram of an exemplary computer network 100 comprising a plurality of nodes A-D and Z, such as routers or other network devices, interconnected as shown. The nodes may be a part of one or more autonomous systems, routing domains, or other networks or subnetworks. For instance, router Z may be a provider edge (PE) device of a provider network, (e.g., a service provider network) that is interconnected to one or more customer networks through customer edge (CE) devices, such as router A. Those skilled in the art will understand that the nodes A-D and Z may be any nodes within any arrangement of computer networks, and that the view shown herein is merely an example. For example, the nodes may be configured as connections to/from one or more virtual private networks (VPNs), as will be understood by those skilled in the art. Notably, the links between the nodes may be represented herein as A-Z, B-Z, etc. Moreover, the links may also be represented as Z-A, Z-B, etc., and the order of the link end nodes is equally interchangeable herein. These examples are merely representative. Those skilled in the art will understand that any number of routers, nodes, links, etc. may be used in the computer network 100 and connected in a variety of ways, and that the view shown herein is for simplicity.

Data packets may be communicated by the nodes A-D and Z using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within a particular network (e.g., a provider or customer network) may rely on predetermined "interior" gateway protocols (IGPs), such as conventional linkstate or distance-vector protocols. In addition, data packets containing network topology information may be exchanged among networks (e.g., provider and customer networks) using "external" gateway protocols, such as the Border Gateway Protocol (BGP). Those skilled in the art will understand that other communication protocols may be used within and among the networks, and that those mentioned above are merely representative.

Figure 2:
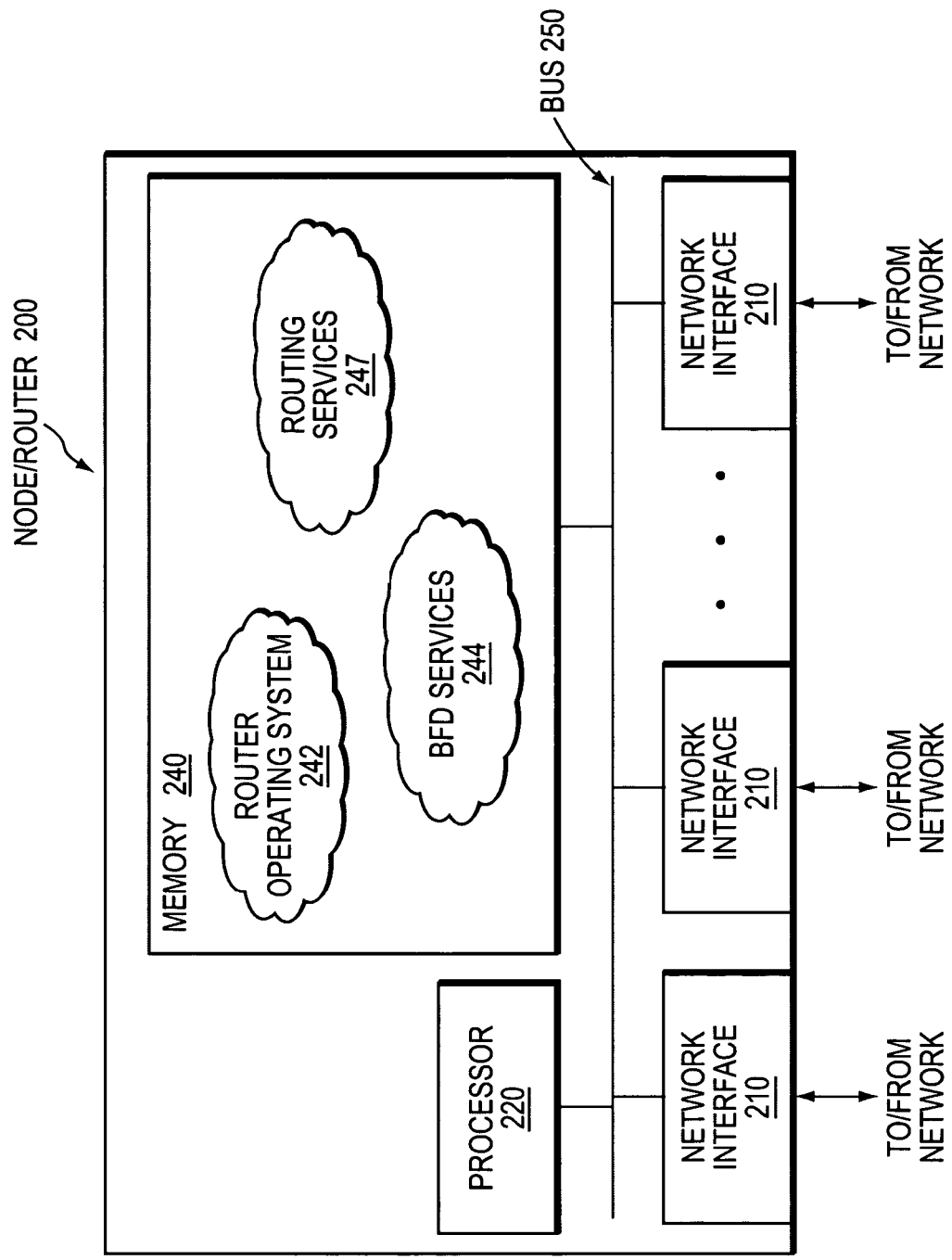
FIG. 2 is a schematic block diagram of an exemplary node that may be advantageously used with the present invention.

FIG. 2 is a schematic block diagram of an exemplary node/router 200 that may be advantageously used with the present invention. The node comprises a plurality of network interfaces 210 (e.g., line cards), a processor 220, and a memory 240 interconnected by a system bus 250. The network interfaces 210 contain the mechanical, electrical and signaling circuitry for communicating data over physical links coupled to the network 100. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for VPN access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing tables or virtual routing tables (not shown). A router operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may comprise routing services 247, and bidirectional forwarding detection (BFD) services 244. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. Routing services 247 may also perform functions related to virtual routing protocols, such as maintaining virtual routing/forwarding (VRF) instances (not shown), etc., as will be understood by those skilled in the art.

BFD services (or process) 244 contain computer executable instructions executed by processor 220 to verify connectivity between two systems/devices, depending on the transmission of BFD control packets ("BFD messages") between the two devices. Assume, for example, that router A (a monitoring node) wishes to verify its connectivity to router Z (a monitored node) using BFD. Router A may transmit a BFD message to router Z, and router A verifies connectivity based on a response/non-response from router Z, e.g., within a particular time period. If router A does not receive a response from router Z within the time period, router A determines that the BFD session has failed or "timed out" (or is "down"), accordingly.

Figure 3:
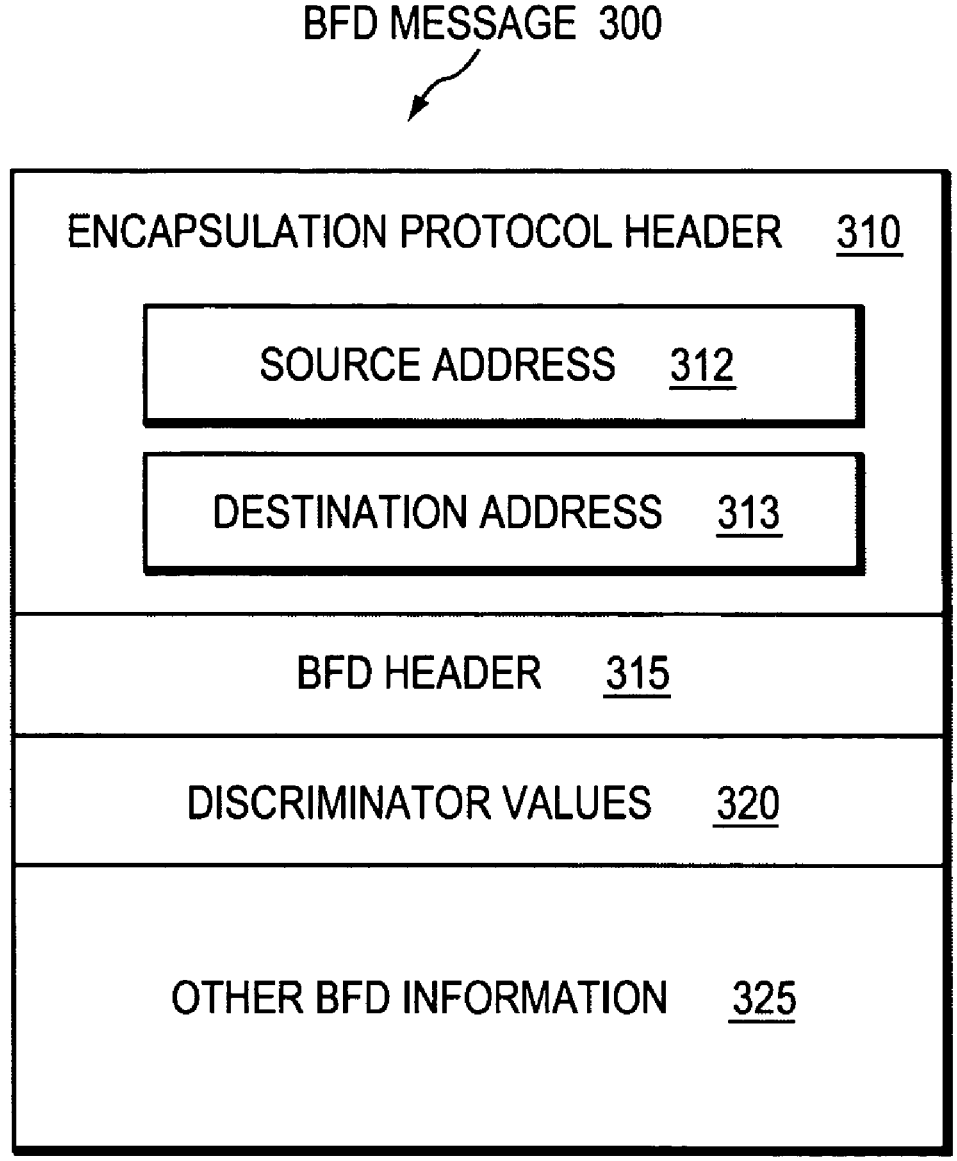
FIG. 3 is a schematic block diagram of an exemplary BFD message that may be used in accordance with the present invention.

FIG. 3 illustrates an exemplary BFD message 300 that may be transmitted by BFD nodes/routers 200. Illustratively, the BFD message 300 is a generic BFD message, and those skilled in the art will understand that other BFD messages may comprise other fields accordingly. The message 300 includes an encapsulation protocol header 310, an optional BFD header field 315, a discriminator values (e.g., a "My Discriminator" and/or "Your Discriminator) field 320, and a field for other BFD information 325. As those skilled in the art will understand, BFD messages 300 are sent in an encapsulation appropriate to the environment (e.g., TCP/IP, MPLS, etc.). Thus, the encapsulation protocol header 310 contains information standard for the specific type of encapsulation. A source address 312 and destination address 313 within the header may be a network address for the sending device and receiving device, respectively.

The BFD header field 315 may comprise standard BFD header information, such as, e.g., a BFD version number, a message length, certain flags, etc., or other information (more or less) as configured by the sending device. Because a sending device may have more than one BFD session established at a time (e.g., with the same receiving device, or other receiving devices), the discriminator fields 320 contain sufficient information to demultiplex the BFD messages 300 to the correct BFD session once it has been received by the receiving device. An example discriminator may be an opaque value that identifies each BFD session, and which is unique among all BFD sessions at each device. For instance, a "My Discriminator" value must be unique at the sending device, while a "Your Discriminator" value must be unique at the receiving device. Also, the other BFD information field 325 may be used according to the BFD protocol, such as, e.g., timer interval values, authentication, etc. Notably, BFD may operate across any number of links and at any protocol layer, e.g., Physical, Data Link, Network, Virtual, etc., as will be understood by those skilled in the art.

The present invention is directed to a technique for distinguishing between link and node failure using BFD in a computer network. According to the novel technique, a BFD session is established over a first link between a monitoring node and a first interface of a monitored node. In addition, one or more novel unidirectional BFD (UBFD) sessions from one or more corresponding other interfaces of the monitored node to the monitoring node (e.g., as configured by the monitored node to detect its failure) are established, the one or more uBFD sessions traversing links other than the first link (e.g., "not-via" the monitored node). For instance, the one or more uBFD sessions correspond to one or more line cards of the monitored node. In response to detecting a lack of connectivity resulting from, e.g., failure of the BFD session, the monitoring node determines that the first link has failed if at least one uBFD session is operational. Moreover, in response to detecting failure of the BFD session and all of the one or more uBFD sessions, the monitoring node determines that the monitored node has failed.

Figure 4:
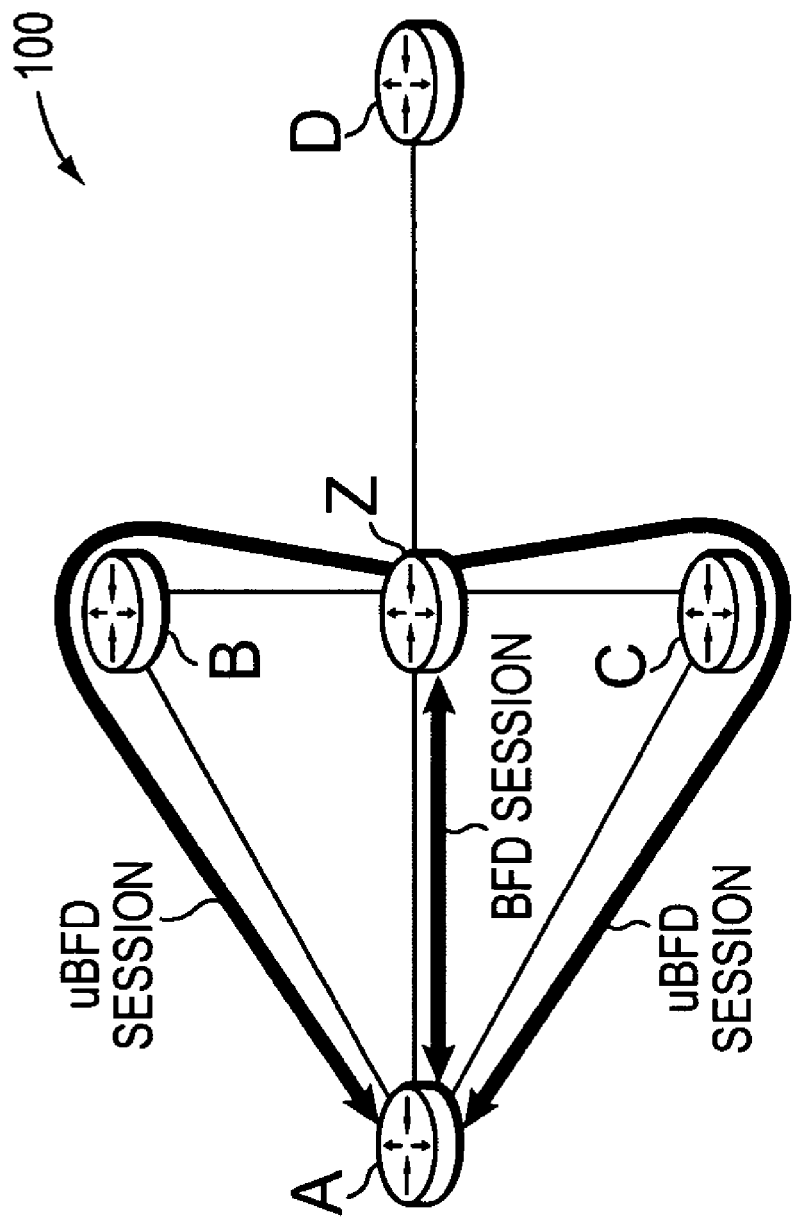
FIG. 4 is an example of the computer network of FIG. 1 configured with a BFD session and uBFD sessions between two devices in accordance with the present invention.

FIG. 4 is an example of the computer network of FIG. 1 configured with a BFD session and uBFD sessions between two devices (router Z and router A) in accordance with the present invention. A conventional BFD session is established between the monitoring node (router A) and the monitored node (router Z). In particular, the BFD session is established over a first link, link A-Z, between the two nodes, which, notably, utilizes a particular network interface 210 of the router Z and of router A. (Those skilled in the art will understand that various virtual interfaces may virtually be connected to more than one link.) BFD messages 300 may then be communicated between the monitoring node and the monitored node accordingly.

According to the present invention, one or more uBFD sessions are also established from the monitored node (router Z) to the monitoring node (router A). Specifically, a novel uBFD session is unidirectional in that the sending node (e.g., router Z) only sends BFD messages 300 to the receiving node (e.g., router A) for analysis. The receiving node is not required to respond to the sending node. Those skilled in the art will appreciate the difference between a uBFD session and a BFD Echo session, in which the receiving node must respond to the sending node. A uBFD session may be established from a source address of the sending node (router Z) to a destination address of the receiving node (router A), particularly over a specific interface of the sending node. Furthermore, the uBFD session may be configured to transmit uBFD messages every 't' milliseconds (ms), and the receiving node may be configured to declare the uBFD session down after not receiving a uBFD message for 'h' ms. Notably, a uBFD message may have a similar, if not substantially the same, configuration as BFD message 300 above. For instance, the discriminator values field 320 may simply comprise a "your discriminator" value for the receiving/monitoring node (router A). Other indications that the BFD message 300 is a uBFD message may be included, such as, e.g., within the BFD header 315, as will be understood by those skilled in the art.

In accordance with the present invention, the monitored node (router Z), e.g., a system administrator or dynamic software process operating at the monitored node, may determine the number of specific interfaces from which the uBFD sessions originate in order to, e.g., distinguish failure of the monitored node. In other words, in addition to the conventional BFD session interface, the monitored node determines the minimum sufficient number of other interfaces (i.e., uBFD sessions) that must fail before a monitoring node (router A) can declare the monitored node as down. This number may be configured as an arbitrary number, or, more particularly according to the invention, as a number based on the total number of network interfaces or line cards at the monitored node. For instance, any number from at least two to a number equal to all of the interfaces or line cards may be used, as configured by the monitored node. Those skilled in the art will understand that ratios/percentages of total interfaces/line cards may also be used. Assume, for example, that router Z has four line cards, one for each connection to routers A-D, respectively. Further assume that router Z determines that at least three of the four line cards must fail before a monitoring node (router A) can declare router Z as having failed.

Once the number of specific interfaces is determined, the monitored node (router Z) establishes the appropriate number of uBFD sessions to the monitoring node (router A) over those specific interfaces. In the example above, router Z determined that three of its interfaces (e.g., line cards) must fail prior to its being declared down. The BFD session traverses a first interface (Z-A), so two other interfaces (i.e., other than the BFD interface) must be selected, e.g., based on connectivity, random selection, or other means, that do not traverse the first interface. In FIG. 4, assume router Z selects the interfaces to router B (Z-B), and to router C (Z-C) as the interfaces for the uBFD sessions. As mentioned above, it is important to establish the uBFD sessions on distinct interfaces (e.g., line cards), in order to ensure that a single line card failure will not cause multiple uBFD sessions to terminate, thus creating a false indication of node failure.

To prevent the utilization of the first link and/or the Z-A interface of the monitored and monitoring nodes, each of the uBFD sessions may be addressed by a not-via address at the monitoring node (router A). For instance, router A may have a "normal" address that may be reached by any node or interface, e.g., router Z over link A-Z. By providing an address of router A that excludes using (or is not-via) router Z (or not-via link A-Z), the uBFD sessions can ensure that the uBFD messages 300 will not utilize the same resources as the BFD session over link A-Z. In other words, so long as there remains a path from routers B and C to router A other than over link A-Z, the uBFD messages 300 will reach the not-via address of router A.

Notably, when configured by a system administrator on both the monitored node (router Z) and the monitoring node (router A), these configurations may be made statically. Alternatively, however, the monitoring node may communicate its monitoring to the monitored node, such as, e.g., though a requested establishment of a BFD session. In response to the communication, the monitored node may respond to the monitoring node with the number of uBFD sessions to expect in accordance with the present invention. Moreover, the monitored node may also inform the monitoring node of the specific interfaces from which the uBFD sessions originate. With this information, the monitoring node may determine whether it is receiving the appropriate messages, as described below.

With the BFD session operating over the first link A-Z, and the one or more uBFD sessions operating from separate interfaces (line cards) not-via the first link, the monitoring node (router A) can make conclusive determinations as to whether the first link (A-Z) has failed or the monitored node (router Z) has failed. Specifically, while all BFD and uBFD messages are received within a specified time limit (e.g., 'h' ms), both the link and the monitored node are functioning properly. If a BFD message is not received within the time limit, however, but at least one uBFD message is received, the monitoring node determines that the first (BFD) link is down. If, on the other hand, no BFD and no uBFD messages are received in the time limit (i.e., all sessions with router Z have timed out), then the monitoring node determines that the monitored node has failed. (Those skilled in the art will understand that any time some but not all of the BFD or uBFD messages have not been received, the monitoring node may determine that those particular sessions are down.) A strategic benefit of the present invention is avoidance of node protection technique applications unless the node has actually failed. For example, performing node protection for a high-volume node (e.g., a PE device) when the node has not failed may be unnecessary and costly, particularly in situations where the high-volume node does not have a backup or alternate, in which case the traffic flowing to the high-volume node may stop entirely.

Once it is conclusively determined that a link or monitored node has failed, various corresponding link or node protection techniques may be applied at the monitoring node accordingly, as will be understood by those skilled in the art. For example, traffic may be rerouted, such as with fast reroute (FRR) techniques, alternate paths may be used, etc. Those skilled in the art will understand that any node/link protection techniques may benefit from the present invention, and that those mentioned herein are merely exemplary. Further, other actions may be performed in response to a failed link or node, as will be generally understood by those skilled in the art, that may also benefit from the present invention. For instance, protocol sessions may be terminated, topology may be updated, etc.

Figure 5:
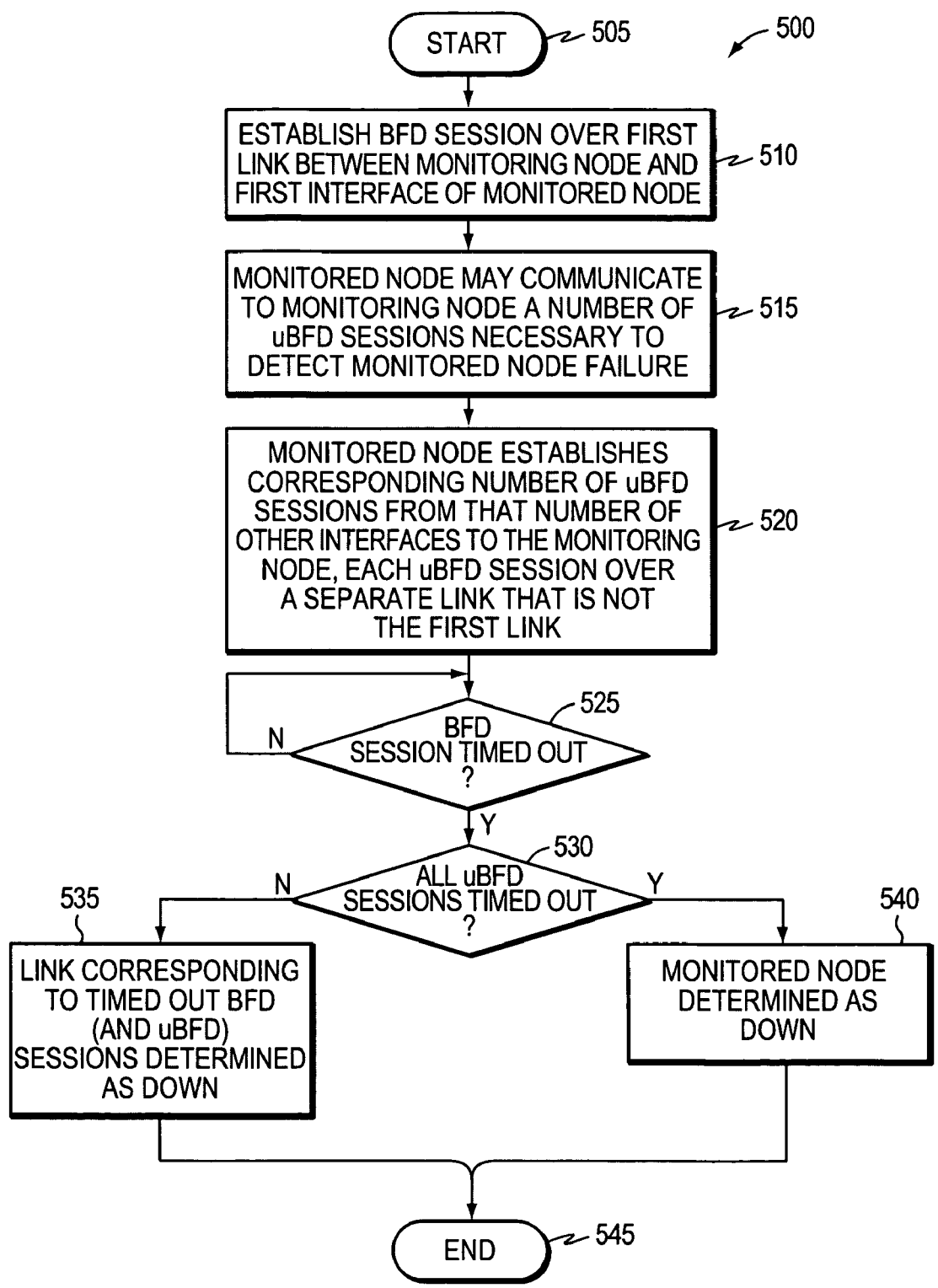
FIG. 5 is a flowchart illustrating a procedure for distinguishing between link and node failure using BFD in accordance with the present invention.

FIG. 5 is a flowchart illustrating a procedure for distinguishing between link and node failure using BFD in accordance with the present invention. The procedure 500 starts at step 505, and continues to step 510, where a BFD session is established over a first link (e.g., link A-Z) between a monitoring node (e.g., node A) and a first interface of a monitored node (e.g., node Z). As described above, at step 515, the monitored node may communicate to the monitoring node a number of uBFD sessions (e.g., two) necessary to detect a failure of the monitored node (e.g., a certain number of other interfaces or line cards). At step 520, the monitored node establishes a corresponding number of uBFD sessions (e.g., two) from that number of other interfaces to the monitoring node, where each uBFD session is established over a separate link that is not the first link (e.g., links Z-B and Z-C). Notably, the uBFD sessions may be configured for traversing links not-via node Z to ensure that link A-Z is not utilized, as described above.

With the BFD and uBFD sessions established and operational, the monitoring node determines when the BFD session with the monitored node times out (i.e., is down) at step 525. Once the BFD session is down, the monitoring node determines whether all the uBFD sessions to the monitored node have also timed out (i.e., are down) at step 530. If not, the monitoring node determines that the link corresponding to the timed out BFD session (e.g., link A-Z) is down at step 535. Notably, if other (but not all) uBFD sessions are also down, the monitoring node may also determine that those corresponding links are also down at step 535, as described above. If, on the other hand, at step 530 all the uBFD sessions time out, the monitoring node determines that the monitored node is down at step 540. The procedure then ends at step 545. Those skilled in the art will understand as described above that various link and/or node protection techniques may then be applied depending upon whether a link or node is determined as down in accordance with the present invention.

Advantageously, the novel technique distinguishes between link and node failure using BFD in a computer network. By establishing BFD and additional uBFD sessions from the monitored node along paths diverse from the first link, the novel technique provides the ability to determine whether a link (e.g., or line card) or node has failed depending upon which of the BFD and uBFD sessions remain operational. Accordingly, the present invention minimizes false detection of failed nodes, and thus minimizes performance of unnecessary node protection techniques.

While there has been shown and described an illustrative embodiment that distinguishes between link and node failure using BFD in a computer network, it is to be understood that various other adaptations and modifications may be made within the spirit and scope of the present invention. For example, the invention has been shown and described herein using UBFD sessions from specific interfaces. However, the invention in its broader sense is not so limited, and may, in fact, use conventional BFD sessions from specific interfaces. Further, those skilled in the art will understand that while the examples given above refer to interfaces generally, both physical and virtual interfaces may be used in accordance with the present invention.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
establishing a bidirectional forwarding detection (BFD) session over a first link between a monitoring node and a first interface of a monitored node;
determining a number of other interfaces of the monitored node on which to establish unidirectional BFD (uBFD) sessions based on a total number of interfaces of the monitored node, the number of other interfaces being less than the total number of interfaces of the monitored node;
establishing uBFD sessions from corresponding ones of the number of other interfaces of the monitored node to the monitoring node, the uBFD sessions traversing links other than the first link;
detecting failure of the BFD session over the first link between the monitoring node and the first interface of the monitored node; and
in response to detecting the failure of the BFD session over the first link between the monitoring node and the first interface of the monitored node, distinguishing between a link failure of the first link between the monitoring node and the first interface of the monitored node and a node failure of the monitored node by determining if at least one uBFD session of the uBFD sessions is still operational after the BFD session has failed, and if so, concluding that the first link has failed, and if not, concluding that the monitored node has failed.

2. The method as in claim 1, further comprising:
determining that either the BFD or one of the uBFD sessions have failed based on non-response for a configurable length of time.

3. The method as in claim 1, further comprising:
establishing the uBFD sessions to a not-via address of the monitoring node excluding the monitored node.

4. The method as in claim 1, further comprising:
establishing the uBFD sessions to a not-via address of the monitoring node excluding the first link between the monitoring node and the monitored node.

5. The method as in claim 1, further comprising:
performing one or more link protection techniques at the monitoring node in the event the first link to the monitored node is determined to fail.

6. The method as in claim 1, wherein each of the other interfaces from which the uBFD sessions are established corresponds to a separate line card of the monitored node.

7. The method as in claim 1, wherein the number of other interfaces is a minimum required number of other interfaces from which to establish the uBFD sessions to detect a monitored node failure.

8. The method as in claim 1, further comprising:
notifying the monitoring node of the number of other interfaces from which the uBFD sessions are established.

9. The method as in claim 1, further comprising:
notifying the monitoring node of particular other interfaces from which the uBFD sessions are established.

10. The method as in claim 1, further comprising:
performing one or more node protection techniques at the monitoring node in the event the monitored node is determined to fail.

11. An apparatus comprising:
means for establishing a bidirectional forwarding detection (BFD) session over a first link between a monitoring node and a first interface of a monitored node;
means for determining a number of other interfaces of the monitored node on which to establish unidirectional BFD (uBFD) sessions based on a total number of interfaces of the monitored node, the number of other interfaces being less than the total number of interfaces of the monitored node;

means for establishing uBFD sessions from corresponding ones of the number of other interfaces of the monitored node to the monitoring node, the uBFD sessions traversing links other than the first link;

means for detecting failure of the BFD session over the first link between the monitoring node and the first interface of the monitored node; and means for distinguishing, in response to detecting the failure of the BFD session over the first link between the monitoring node and the first interface of the monitored node, between a link failure of the first link between the monitoring node and the first interface of the monitored node and a node failure of the monitored node by determining if at least one uBFD session of the uBFD sessions is still operational after the BFD session has failed, and if so, concluding that the first link has failed, and if not, concluding that the monitored node has failed.

12. A non-transitory and tangible computer readable medium containing executable program instructions, the executable program instructions comprising program instructions for:

establishing a bidirectional forwarding detection (BFD) session over a first link between a monitoring node and a first interface of a monitored node;

determining a number of other interfaces of the monitored node on which to establish unidirectional BFD (uBFD) sessions based on a total number of interfaces of the monitored node, the number of other interfaces being less than the total number of interfaces of the monitored node;

establishing uBFD sessions from corresponding ones of the number of other interfaces of the monitored node to the monitoring node, the uBFD sessions traversing links other than the first link;

detecting failure of the BFD session over the first link between the monitoring node and the first interface of the monitored node; and in response to detecting the failure of the BFD session over the first link between the monitoring node and the first interface of the monitored node, distinguishing between a link failure of the first link between the monitoring node and the first interface of the monitored node and a node failure of the monitored node by determining if at least one uBFD session of the uBFD sessions is still operational after the BFD session has failed, and if so, concluding that the first link has failed, and if not, concluding that the monitored node has failed.

13. A monitoring node comprising:

two or more network interfaces;

a processor coupled to the two or more network interfaces and adapted to execute software processes; and a memory adapted to store a process executable by the processor, the process configured to:

establish a bidirectional forwarding detection (BFD) session over a first link from a first network interface of the two or more network interfaces of the monitoring node, the BFD session established with a first interface of a monitored node, establish unidirectional BFD (uBFD) sessions from corresponding ones of a number of other interfaces of the monitored node, the number of other interfaces of the monitored node based on a total number of interfaces of the monitored node and being less than the total number of interfaces of the monitored node, the one or more uBFD sessions received on one or more network interfaces of the monitoring node other than the first network interface of the monitoring node, detect failure of the BFD session over the first link between the monitoring node and the first interface of the monitored node, and distinguish, in response to detecting the failure of the BFD session over the first link between the monitoring node and the first interface of the monitored node, between a link failure of the first link between the monitoring node and the first interface of the monitored node and a node failure of the monitored node by determining if at least one uBFD session of the uBFD sessions is still operational after the BFD session has failed, and if so, concluding that the first link has failed, and if not, concluding that the monitored node has failed.

14. The monitoring node as in claim 13 wherein the BFD process is configured to determine failure of either the BFD or one of the uBFD sessions based on non-response for a configurable length of time.

15. The monitoring node as in claim 13 wherein the BFD process is configured to establish the uBFD sessions to a not-via address of the monitoring node.

16. A monitored node comprising:

a plurality of network interfaces;

a processor coupled to the plurality of network interfaces and adapted to execute software processes; and a memory adapted to store a process executable by the processor, the process configured to:

establish a BFD session over a first network interface of the plurality of network interfaces of the monitored node, the BFD session established with a monitoring node, determine a number of other network interfaces of the plurality of network interfaces on which to establish unidirectional BFD (uBFD) sessions based on a total number of network interfaces of the plurality of network interfaces, the number of other network interfaces being less than the total number of network interfaces of the plurality of network interfaces, and establish uBFD sessions from corresponding ones of the number of other interfaces of the plurality of network interfaces with the monitoring node, and continue operating at least one uBFD session of the uBFD sessions after the BFD session has failed over the first link between the monitoring node and the first interface of the monitored node, such that if the monitoring node detects failure of the BFD session over the first link between the monitoring node and the first interface of the monitored node and at least one uBFD session of the uBFD sessions being still operational after the BFD session has failed, the monitoring node concludes that the first link has failed and that the monitored node has not failed.

17. The monitored node as in claim 16 wherein each of the network interfaces of the monitored node other than the first network interface corresponds to a separate line card of the monitored node.

18. The monitored node as in claim 16 wherein the process is further configured to notify the monitoring node of the number of other interfaces.

19. A method comprising:

establishing a bidirectional forwarding detection (BFD) session over a first link between a monitoring node and a first interface of a monitored node, the BFD session to pass BFD protocol messages in both directions between the monitoring node and the first interface of the monitored node;

determining a number of other interfaces of the monitored node on which to establish unidirectional BFD (uBFD) sessions as proportional a total number of interfaces of the monitored node, the number of other interfaces being less than the total number of interfaces of the monitored node;

establishing unidirectional BFD (uBFD) sessions from corresponding ones of the number of other interfaces of the monitored node to the monitoring node, the uBFD sessions traversing links other than the first link, each uBFD session to pass BFD protocol messages from one of the other interfaces of the monitored node to the monitoring node, without a response being required from the monitoring node;

detecting failure of the BFD session over the first link between the monitoring node and the first interface of the monitored node; and in response to detecting the failure of the BFD session over the first link between the monitoring node and the first interface of the monitored node, distinguishing between a link failure of the first link between the monitoring node and the first interface of the monitored node and a node failure of the monitored node by determining if at least one uBFD session of the number of uBFD sessions is still operational after the BFD session has failed, and if so, concluding that the first link has failed, and if not, concluding that the monitored node has failed.

20. The method as in claim 19, wherein the establishing uBFD sessions establishes the uBFD sessions to a not-via address of the monitoring node excluding the monitored node.

21. The method as in claim 19, wherein the establishing uBFD sessions establishes the uBFD sessions to a not-via address of the monitoring node excluding the first link between the monitoring node and the first interface of the monitored node.

22. The method as in claim 19, wherein each of the other interfaces from which the uBFD sessions are established correspond to a separate line card of the monitored node.

23. The method as in claim 19, further comprising:
notifying the monitoring node of the number of other interfaces from which the uBFD sessions are established.

24. The method as in claim 19, further comprising:
notifying the monitoring node of the particular other interfaces from which the uBFD sessions are established.

25. An apparatus comprising:
a plurality of interfaces;
a processor coupled to the plurality interfaces and configured to execute software processes; and
a memory configured to store a process executable by the processor, the process when executed operable to:
establish a bidirectional forwarding detection (BFD) session over a first link between a first interface of the plurality of interfaces and a monitoring node, the BFD session to pass BFD protocol messages in both directions between the first interface and the monitoring node,
determine a number of other interfaces of the plurality of interfaces on which to establish unidirectional BFD (uBFD) sessions as proportional a total number of interfaces of the plurality of interfaces, the number of other interfaces less than the total number of interfaces of the plurality of interfaces,
establish unidirectional BFD (uBFD) sessions from corresponding ones of the number of other interfaces of the plurality of interfaces to the monitoring node, the uBFD sessions traversing links other than the first link, each uBFD session to pass BFD protocol messages from one of the other interfaces to the monitoring node, without a response being required from the monitoring node, and
continue operating at least one uBFD session after the BFD session has failed over the first link to permit the monitoring node to distinguish between a link failure of the first link and a node failure of the apparatus by determination whether at least one uBFD session is still operational after the BFD session has failed.

26. The apparatus as in claim 25, wherein the uBFD sessions are established to a not-via address of the monitoring node excluding the monitored node.

27. The apparatus as in claim 25, wherein the process when executed is further operable to notify the monitoring node of the number of other interfaces from which the uBFD sessions are established.

28. The apparatus as in claim 25, wherein the process when executed is further operable to notify the monitoring node of the particular other interfaces from which the uBFD sessions are established.

* * * * *